United States Patent
Nath et al.

(10) Patent No.: US 7,227,723 B2
(45) Date of Patent: Jun. 5, 2007

(54) REDUCED LUBRICANT ACCUMULATING SLIDER

(75) Inventors: Bijoyendra Nath, Minneapolis, MN (US); Yu-Li Chang, Prior Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 741 days.

(21) Appl. No.: 09/884,837

(22) Filed: Jun. 19, 2001

(65) Prior Publication Data

US 2002/0008938 A1    Jan. 24, 2002

Related U.S. Application Data

(60) Provisional application No. 60/212,940, filed on Jun. 20, 2000.

(51) Int. Cl.
*G11B 5/60* (2006.01)
(52) U.S. Cl. .............................. 360/235.7; 360/236.3; 360/236.5
(58) Field of Classification Search ............ 360/235.6, 360/236, 236.1, 236.3, 236.2, 236.5, 235.7, 360/237, 236.8, 236.9
See application file for complete search history.

(56) References Cited

U.S. PATENT DOCUMENTS

| | | | |
|---|---|---|---|
| 5,034,828 A | 7/1991 | Ananth et al. | |
| 5,067,037 A | 11/1991 | Ananth et al. | |
| 5,128,822 A * | 7/1992 | Chapin et al. | ........... 360/236.3 |
| 5,220,470 A | 6/1993 | Ananth et al. | |
| 5,327,311 A | 7/1994 | Ananth et al. | |
| 5,479,306 A | 12/1995 | Ananth et al. | |
| 5,508,861 A | 4/1996 | Ananth et al. | |
| 5,559,650 A | 9/1996 | Repphun et al. | |
| 5,572,386 A | 11/1996 | Ananth et al. | |
| 5,650,900 A | 7/1997 | Wei et al. | |
| 5,708,540 A | 1/1998 | Ananth et al. | |
| 5,751,517 A | 5/1998 | Agarwal | |
| 5,820,945 A | 10/1998 | Wei et al. | |
| 5,853,959 A * | 12/1998 | Brand et al. | ................. 430/320 |
| 5,973,880 A * | 10/1999 | Hashimoto et al. | ....... 360/236.2 |
| 6,055,127 A * | 4/2000 | Boutaghou et al. | ......... 360/236 |
| 6,057,983 A * | 5/2000 | Kajitani | ................... 360/235.6 |
| 6,445,542 B1 * | 9/2002 | Levi et al. | ............... 360/236.5 |
| 6,462,909 B1 * | 10/2002 | Boutaghou et al. | ....... 360/235.8 |
| 6,490,134 B2 * | 12/2002 | Boutaghou | ............... 360/235.7 |
| 6,490,135 B1 * | 12/2002 | Sannino et al. | ........... 360/235.8 |
| 6,535,353 B2 * | 3/2003 | Boutaghou et al. | ....... 360/235.1 |
| 6,560,071 B2 * | 5/2003 | Chapin et al. | ............ 360/235.7 |
| 6,594,113 B2 * | 7/2003 | Rao et al. | ................. 360/235.8 |
| 6,639,755 B2 * | 10/2003 | Boutaghou et al. | ....... 360/235.7 |
| 6,661,611 B1 * | 12/2003 | Sannino et al. | ........... 360/236.3 |
| 6,661,612 B1 * | 12/2003 | Peng | ........................ 360/236.3 |
| 6,697,223 B2 * | 2/2004 | Lewis et al. | .............. 360/235.7 |
| 6,950,281 B2 * | 9/2005 | Kameyama | .................. 360/235 |
| 6,989,966 B2 * | 1/2006 | Rajakumar | ................ 360/235.6 |
| 2002/0071215 A1 * | 6/2002 | Lewis et al. | .............. 360/235.7 |
| 2002/0075599 A1 * | 6/2002 | Rao et al. | .............. 360/235.7 |
| 2003/0011934 A1 * | 1/2003 | Kameyama | .............. 360/236.1 |
| 2003/0058578 A1 * | 3/2003 | Boutaghou et al. | ....... 360/235.8 |
| 2004/0032693 A1 * | 2/2004 | Imamura et al. | .......... 360/235.7 |

\* cited by examiner

*Primary Examiner*—Brian E. Miller

(57) ABSTRACT

A slider having an advanced air bearing can employ control features that permit control of the flow-field streamline direction and thus enable an indirect mass transfer that flushes any accumulated lubricant out of the advanced air bearing. These control features can be located at the air bearing surface or at any recessed height from the air bearing surface. Moreover, these control features can also dislodge and move locations of flow-field stagnation.

20 Claims, 7 Drawing Sheets

REDUCED LUBRICANT ACCUMULATING SLIDER

CROSS REFERENCE TO RELATED APPLICATIONS

This application claims the benefit of U.S. Provisional Application Ser. No. 60/212,940, filed Jun. 20, 2000 entitled "FLOWFIELD STREAMLINES CONTROL AAB FEATURES FOR REDUCED LUBE ACCUMULATION", which application is incorporated by reference herein.

FIELD OF THE INVENTION

The invention relates generally to the interface between a slider and a magnetic disc. More particularly, the invention relates to controlling lubricant accumulation on and around the advanced air bearing (AAB) that controls head-disc spacing.

BACKGROUND OF THE INVENTION

Rotating disc magnetic recording systems typically employ magnetic head transducers which glide over the magnetic disc media on a cushion of air. The mounting or support structure which carries the transducers are termed "sliders." Sliders have air-bearing surfaces that are propelled off the surface of moving media by boundary air which moves with the media disc. The air-bearing surface of a slider is aerodynamically designed to glide on the boundary air due to a pattern of raised rails and recesses which establish the "fly height" of the slider. Read/write transducers are mounted on the rear side of the slider, with the reader sensor and writer gap at the air-bearing surface, facing the moving media.

A slider assembly typically includes a ceramic slider and associated read/write heads, a support flexure arm, interconnection wires between the heads and external signaling devices, and any associated mounting hardware. The slider assembly is mounted on an arm which is movable over the surface of a rotating magnetic disc to position the slider adjacent selected tracks on the disc. Disc drives usually employ multiple discs which rotate together, spaced apart from one another on a single spindle. One slider assembly is provided for each magnetic recording surface in a disc drive.

In magnetic disc drive data storage devices, digital data are written to and read from a thin layer of magnetizable material on a surface of one or more rotating discs. Write and read operations are performed through write and read transducers. The slider and transducers are sometimes collectively referred to as a head, and typically a single head is associated with each disc surface. When the read transducer is a magnetoresistive (MR) type sensor, the combination of the slider and the transducer are frequently referred to as a MR head. The head is selectively moved under the control of electronic circuitry to any one of a plurality of circular, concentric data tracks on the disc surface by an actuator device. Each slider body includes an air bearing surface (ABS). As the disc rotates, the disc drags air beneath the ABS, which develops a lifting force that causes the head to lift and fly above the disc surface.

Typically, there is a layer of lubricant between the disc surface and the head. In order to reduce the spacing between the head and the disc, new air bearing surfaces known as advanced air bearings (AAB) have been developed. Unfortunately, these new air bearing surfaces can be prone to lubricant accumulation. In particular, the AABs have particular geometric features that make them more susceptible to flow stagnation and even to flow reversal. Consequently, some combinations of operating conditions can cause the head to accumulate lubricant. This accumulation of lubricant can prevent the head from flying at an optimal or design height.

Thus, a need remains for a way to employ AAB designed heads without suffering from lubricant accumulation. A need remains for an improved AAB head.

The present invention provides a solution to this and other problems, and offers other advantages over the prior art.

SUMMARY OF THE INVENTION

According to a first aspect of the present invention, there is provided a reduced lubricant accumulating slider that includes a first air bearing surface and a second air bearing surface. The slider also includes a center portion that is at least partially located between the first air bearing surface and the second air bearing surface. A first streamline control element is located at least partially between the first air bearing surface and the center portion and a second streamline control element is located at least partially between the second air bearing surface and the center portion.

According to another aspect of the present invention, there is provided a reduced lubricant accumulating slider that includes streamline control means limiting stagnation and flow reversal.

According to yet another aspect of the present invention, there is provided a method of reducing lubricant accumulation in a slider that has a geometry that is susceptible to stagnation and flow reversal. The slider is as described above and the method includes determining which geometric features of the slider are prone to stagnation and flow reversal and modifying air flow around said geometric features in order to carry accumulated lubricant out from under the slider.

The above, as well as additional objects, features, and advantages of the present invention will become apparent in the following detailed written description.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PRESENTLY PREFERRED EMBODIMENTS

The following description is a detailed description of the preferred embodiments presently contemplated for carrying out the present invention. This description is made for the purpose of illustrating the general principles of the present invention and is not meant to limit the inventive concepts claimed herein.

Figure 1:
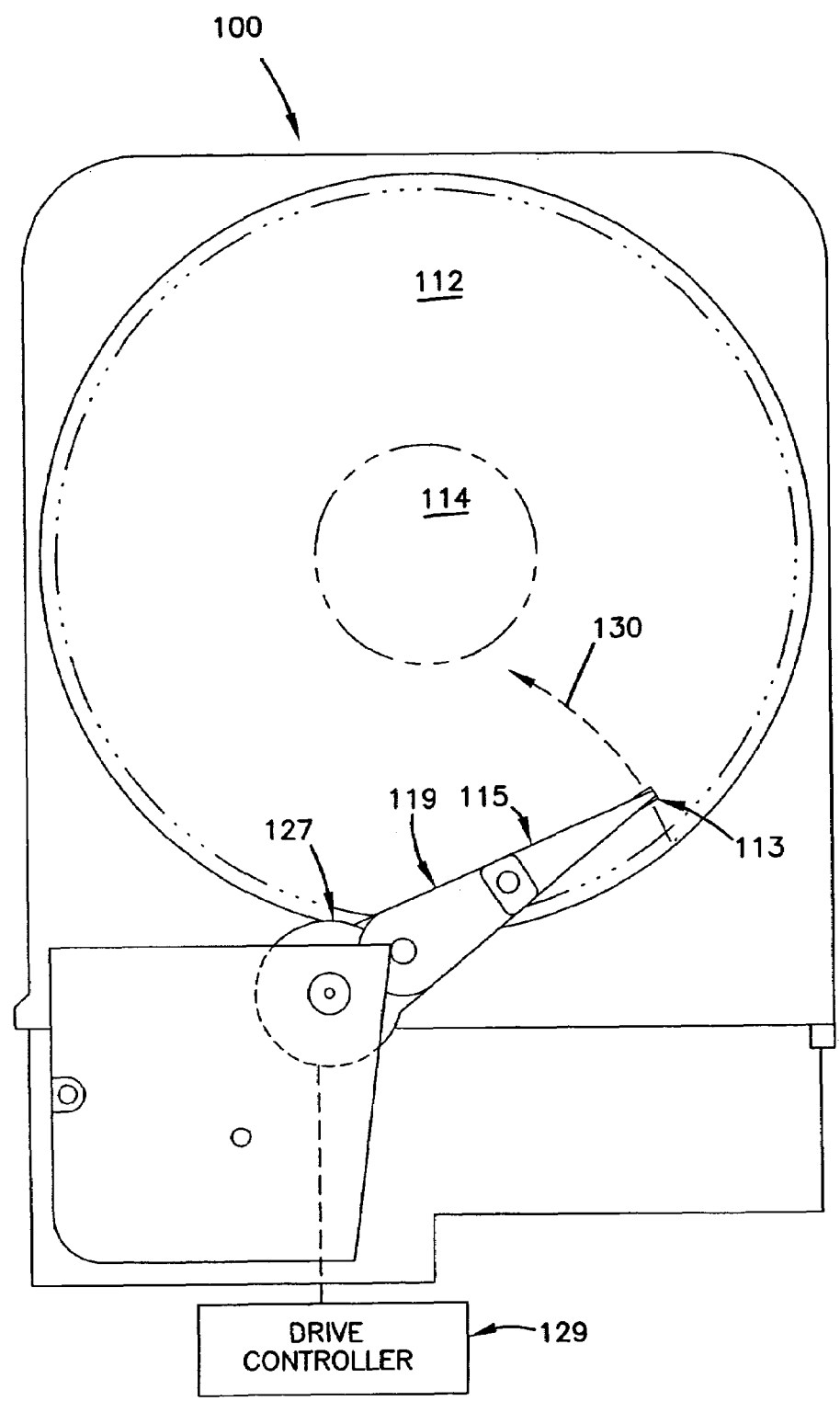
FIG. 1 is a simplified schematic drawing of a magnetic recording disc system.

FIG. 1 is a simplified schematic diagram of a disc drive system 100 embodying the present invention. As shown in FIG. 1, at least one rotatable magnetic disc 112 is supported on a spindle 114 and rotated by a disc drive motor. The magnetic recording media on each disc is in the form of an annular pattern of concentric data tracks (not shown) on disc 112.

At least one slider 113 is positioned on the disc 112, each slider 113 supporting one or more magnetic read/write heads incorporating the present invention. As the discs 112 rotate, slider 113 is moved radially in and out as shown by arrow 130 over the disc surface so that the heads located on the slider 113 may access different portions of the disc where desired data is either recorded or written to. Each slider 113 is attached to an actuator arm 119 by a suspension 115. The suspension 115 provides a slight spring force which biases the slider 113 against the disc surface. Each actuator arm 119 is attached to an actuator 127.

During operation of the disc storage system, the rotation of disc 112 generates an air bearing between an air bearing surface (ABS) on the slider 113 and the disc 112. The ABS is the surface of slider 113 which faces the surface of the disc. The air bearing exerts an upward force or lift on the slider 113. The air bearing thus counter-balances the slight spring force of suspension 115 and supports the slider 113 slightly above the disc 112 surface by a small, substantially constant spacing during normal operation.

The various components of the disc storage system are controlled in operation by control signals generated by a drive controller 129, such as access control signals and internal clock signals. Typically, the drive controller 129 includes logic control circuits, storage and a microprocessor. The drive controller 129 generates control signals to control various system operations such as drive motor control signals and head position and seek control signals. The control signals provide the desired current profiles to optimally move and position slider 113 to the desired data track on disc 112 as is well known.

The above description of a typical magnetic disc storage system, and the accompanying illustration of FIG. 1 are for representation purposes only. It should be apparent that disc storage systems may contain a large number of discs and actuators, and each actuator may support a number of sliders.

Figure 2:
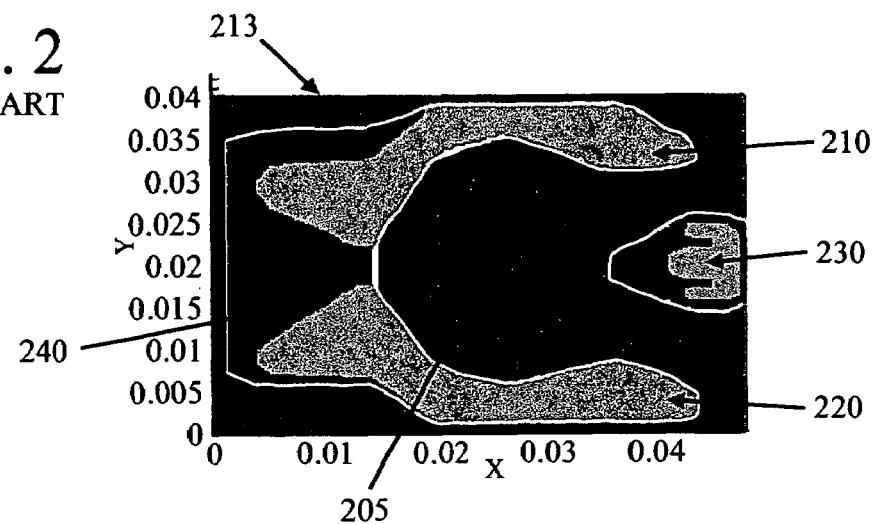
FIG. 2 is a diagrammatical top plan view of an advanced air bearing slider lacking streamline control elements.
Figure 3:
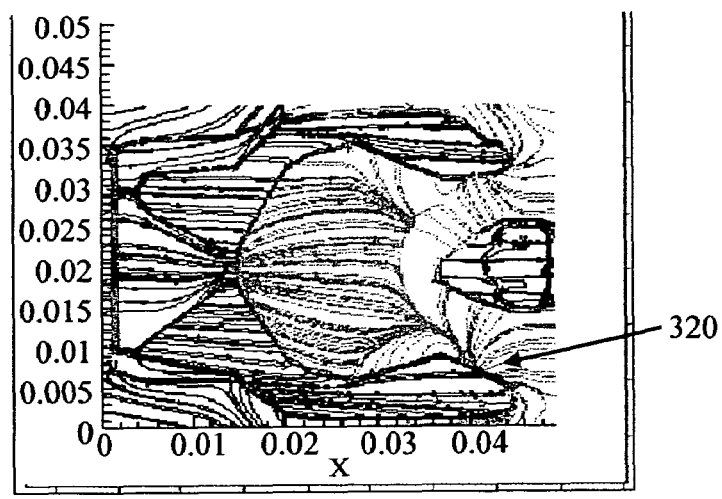
FIG. 3 illustrates the flow streamlines that result from the slider of FIG. 2, taken at an inner disc diameter.
Figure 4:
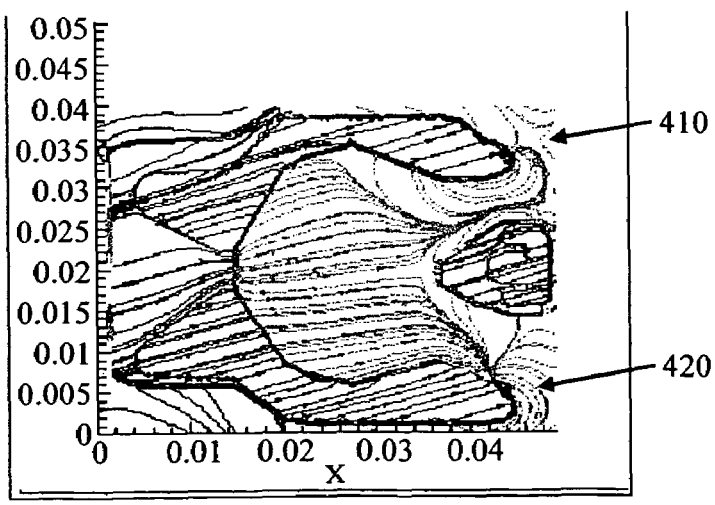
FIG. 4 illustrates the flow streamlines that result from the slider of FIG. 2, taken at an outer disc diameter.

FIG. 2 is a diagrammatical top plan view of a slider 213, illustrating the geometric configuration of the first air bearing surface 210, the second air bearing surface 220 and the center portion 230. A third air bearing surface 240 bridges between the first and second air bearing surfaces 210, 220, respectively. A recessed area 205 is positioned between the air bearing surfaces 210, 220, 230 and 240. FIGS. 3 and 4 provide illustrative streamlines taken at a first radius, corresponding to an inner diameter of the disc 112, and a second radius, corresponding to an outer diameter of the disc 112, respectively.

The disc 112 rotates at an essentially constant rotational velocity. Thus, the linear velocity of a particular point on the surface of the disc 112 increases as one moves from an inner diameter to an outer diameter of the disc 112. As the relative velocity between the slider 113 and the disc 112 increases, there is an increasing risk of lubricant accumulation. While FIG. 3 shows a possible stagnation location at point 320, little or no flow reversal is visible. In contrast, FIG. 4 demonstrates both a possible flow reversal at point 410 and a potential stagnation location at point 420. As expected, the increased relative velocity and increased skew angle increases the risk and possible severity of any lubricant accumulation.

Figure 5:
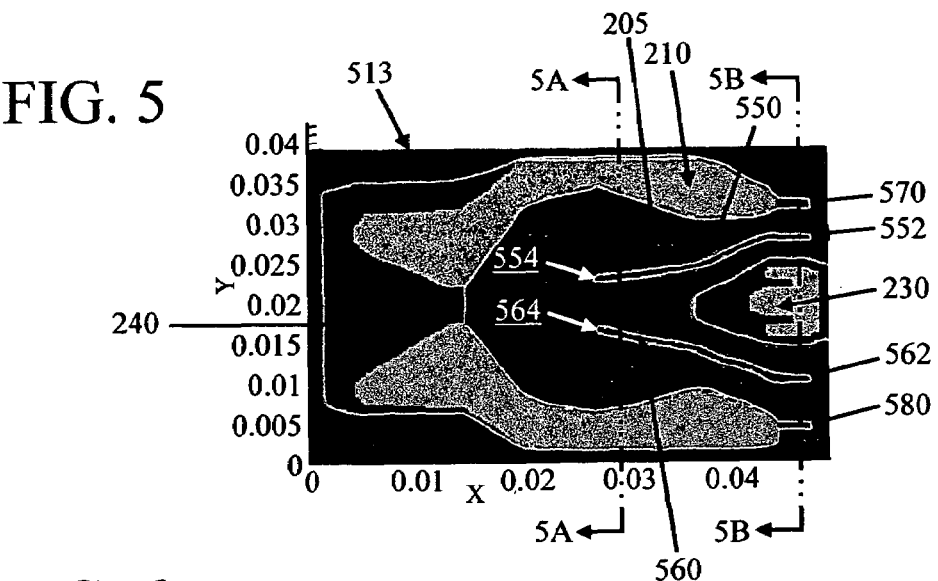
FIG. 5 is a diagrammatical top plan view of the advanced air bearing slider of FIG. 2, incorporating streamline control elements in accordance with a preferred embodiment of the present invention.
Figure 5A:
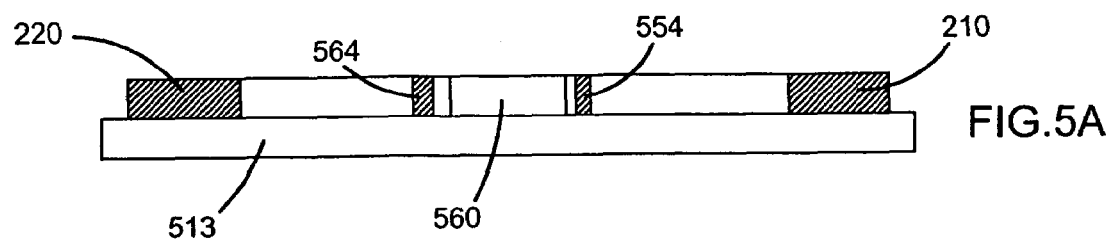
FIG. 5A is a cross-sectional view of the slider shown in FIG. 5 taken along cross-sectional indicators 5A—5A.
Figure 5B:
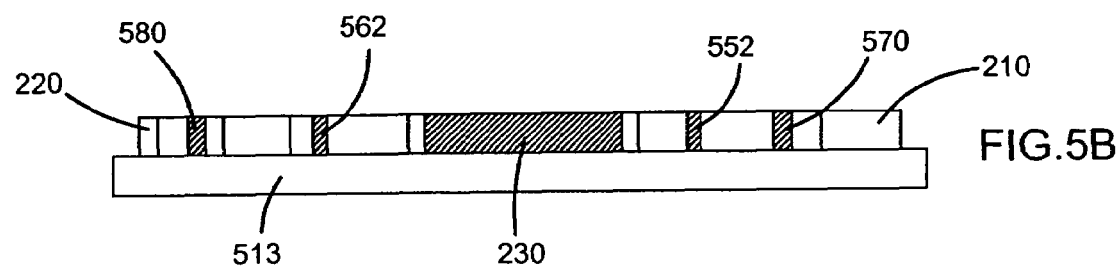
FIG. 5B is a cross-sectional view of the slider shown in FIG. 5 taken along cross-sectional indicators 5B—5B.
Figure 5C:
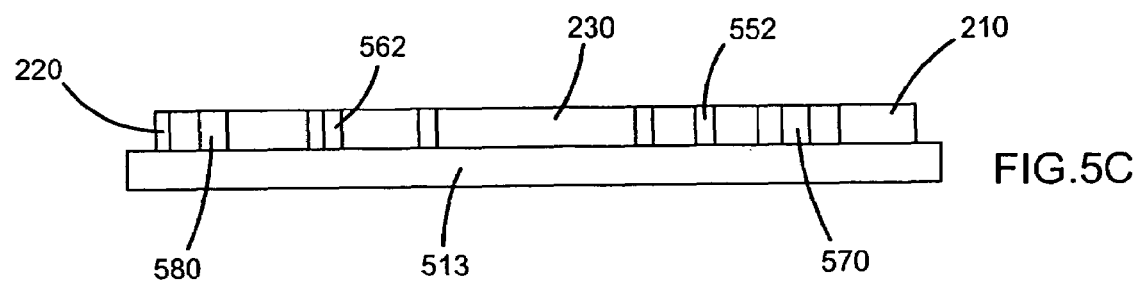
FIG. 5C is an end view of the slider shown in FIG. 5.

FIG. 5 represents a presently preferred embodiment of the present invention. FIG. 5 illustrates an advanced air bearing slider 513 that includes a first air bearing surface 210, a second air bearing surface 220 and a center portion 230. Preferably, the center portion 230 includes a transducer. A third air bearing surface 240 bridges between the first and second air bearing surfaces 210, 220, respectively. Each of the first air bearing surface 210, second air bearing surface 220, center portion 230 and third air bearing surface 240 are elevated or otherwise stand above the recessed area 205 (see FIGS. 5A–5C).

First and second streamline control elements 550 and 560 are positioned on either side of the center portion 230, respectively. Third and fourth streamline control elements 570 and 580 extend in contact with the first air bearing surface 210 and the second air bearing surface 220, respectively.

Figure 8:
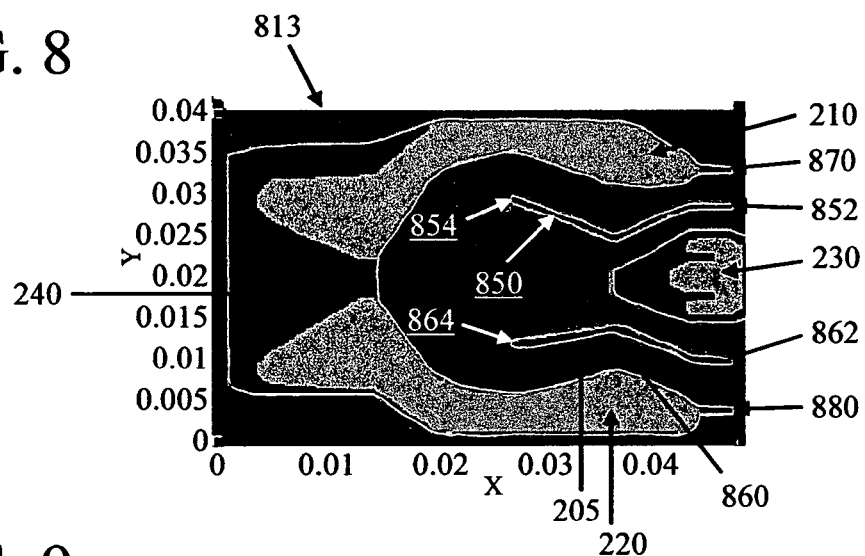
FIG. 8 is a top plan view of the advanced air bearing slider of FIG. 2, incorporating streamline control elements in accordance with another preferred embodiment of the present invention.
Figure 14:
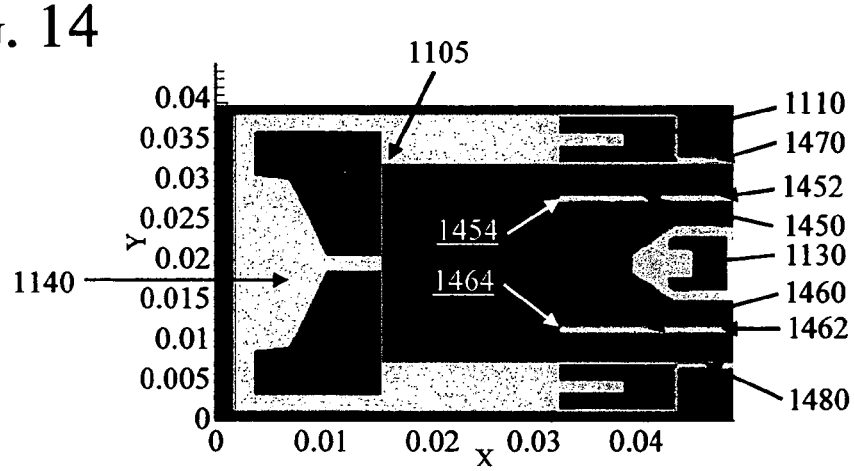
FIG. 14 is a diagrammatical top plan view of the advanced air bearing slider of FIG. 11, incorporating streamline control elements in accordance with yet another preferred embodiment of the present invention.

The streamline control elements 550 and 560 are positioned within the recessed area 205 and stand above the recessed area 205, as do the streamline control elements 570 and 580. The first and second streamline control elements 550 and 560 can be the same height as the first and second air bearing surfaces 210, 220, or they can have a height that is less than the height of the first and second air bearing surfaces 210, 220. The first and second control elements 550 and 560 can be angled (as illustrated in FIGS. 5 and 8), straight and parallel to each other (as illustrated in FIG. 14). It is envisioned that the first and second control elements 550 and 560 can also be curved (not illustrated).

The third and fourth streamline control elements 570 and 580 extend outwardly from an end of the first air bearing surface 210 and the second air bearing surface 220, respectively. As illustrated, these elements are straight and are parallel with each other. However, it is envisioned that the third and fourth streamline control elements 570 and 580 can also be at least partially non-linear.

Preferably, each of the streamline control elements 550, 560, 570 and 580 are formed as a ridge that extends above a plane of the recessed area 205. While a control element can be formed as a plurality of smaller segments, it is preferred that each control element be formed as a single element.

As illustrated, the first streamline control element 550 has a first end 552 that is positioned in alignment with the center portion 230 and a second end 554 that extends towards the third air bearing surface 240. Similarly, the second streamline control element 560 has a first end 562 that is positioned in alignment with the center portion 230 and a second end 564 that extends towards the third air bearing surface 240. In this particular embodiment, the first and second streamline control elements 550 and 560 are configured so that they converge toward one another near the second ends 554 and 564, respectively.

Figure 6:
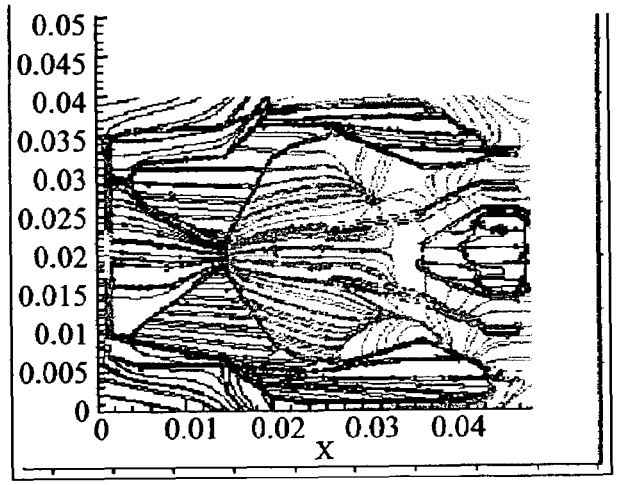
FIG. 6 illustrates the flow streamlines that result from the slider of FIG. 5, taken at an inner disc diameter.
Figure 7:
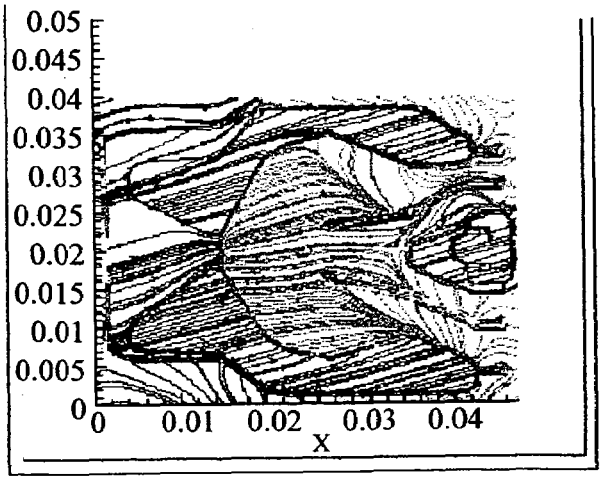
FIG. 7 illustrates the flow streamlines that result from the slider of FIG. 5, taken at an outer disc diameter.

FIGS. 6 and 7 illustrate the streamlines that result from including the first and second streamline control elements 550 and 560. As expected, FIG. 7, which represents the situation at the outer diameter of a disc, demonstrates the most improvement over an advanced air bearing slider 213 lacking such control elements (see FIG. 4). One can see in FIG. 7 that the potential flow reversal point 410 (in FIG. 4) has been removed. Moreover, the potential stagnation point 420 has been moved or removed.

FIG. 8 represents another presently preferred embodiment of the present invention. FIG. 8 illustrates an advanced air bearing slider 813 that includes a first air bearing surface 210, a second air bearing surface 220 and a center portion 230. A third air bearing surface 240 bridges between the first and second air bearing surfaces 210, 220, respectively. First and second streamline control elements 850 and 860 are positioned on either side of the center portion 230, respectively. Third and fourth streamline control elements 870 and 880 extend in contact with the first air bearing surface 210 and the second air bearing surface 220, respectively.

As illustrated, the first streamline control element 850 has a first end 852 that is positioned in alignment with the center portion 230 and a second end 854 that extends towards the third air bearing surface 240. Similarly, the second streamline control element 860 has a first end 862 that is positioned in alignment with the center portion 230 and a second end 864 that extends towards the third air bearing surface 240. In this particular embodiment, the first and second streamline control elements 850 and 860 are configured so that they diverge from one another near the second ends 852 and 862, respectively, instead of converging as illustrated in FIG. 5.

Figure 9:
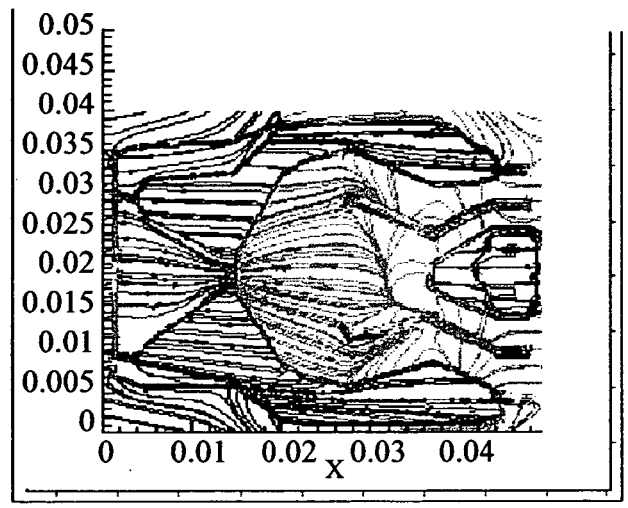
FIG. 9 illustrates the flow streamlines that result from the slider of FIG. 8, taken at an inner disc diameter.
Figure 10:
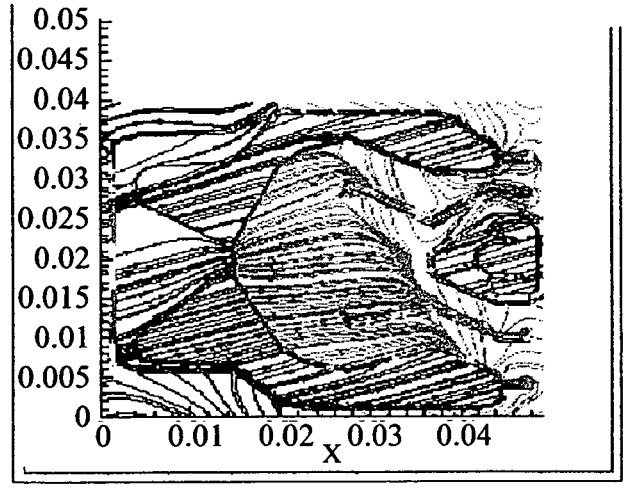
FIG. 10 illustrates the flow streamlines that result from the slider of FIG. 8, taken at an outer disc diameter.

FIGS. 9 and 10 illustrate the streamlines that result from including the first and second streamline control elements 850 and 860. As expected, FIG. 10, which represents the situation at the outer diameter of a disc, demonstrates the most improvement over an advanced air bearing slider 213 lacking such control elements (see FIG. 4). One can see in FIG. 10 that the potential flow reversal point 410 (in FIG. 4) has been removed. Moreover, the potential stagnation point 420 has been moved.

Figure 11:
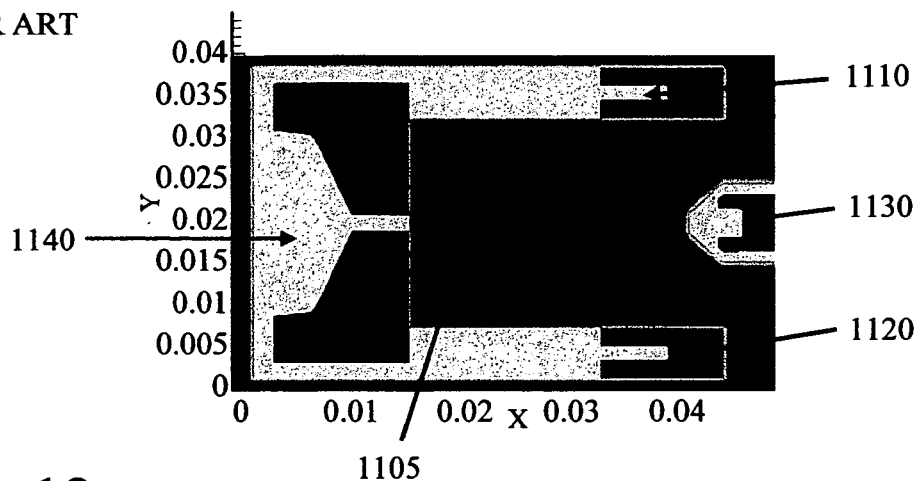
FIG. 11 is a diagrammatical top plan view of an advanced air bearing slider lacking streamline control elements.
Figure 12:
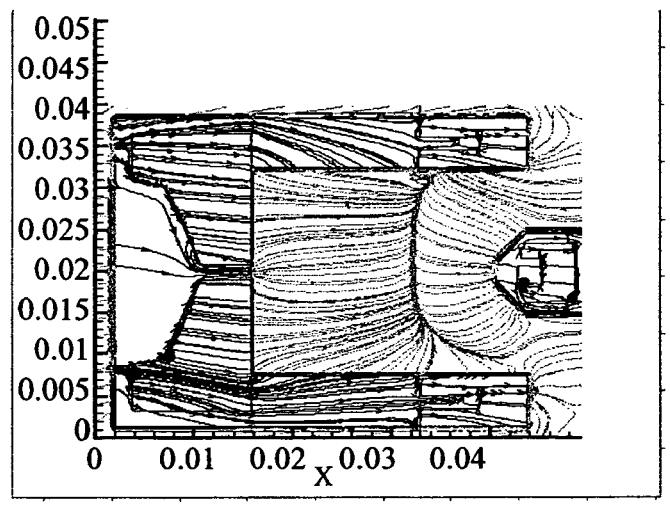
FIG. 12 illustrates the flow streamlines that result from the slider of FIG. 11, taken at an inner disc diameter.
Figure 13:
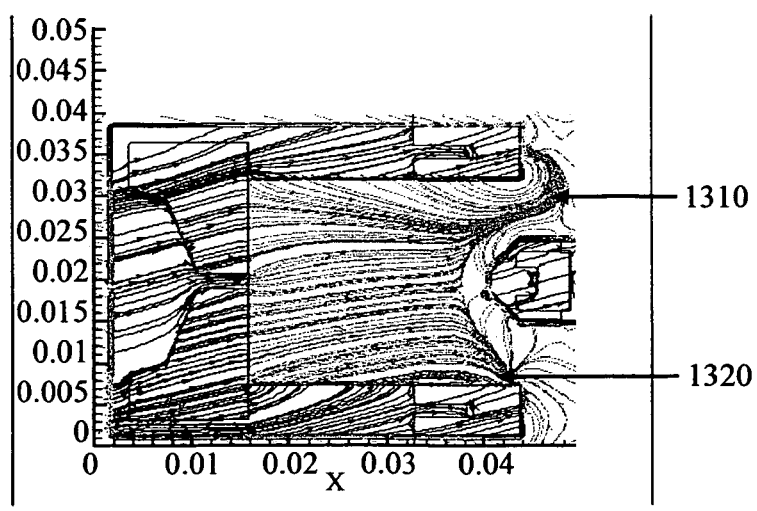
FIG. 13 illustrates the flow streamlines that result from the slider of FIG. 11, taken at an outer disc diameter.

FIG. 11 is a diagrammatical top plan view of an advanced air bearing slider 1113 that lacks streamline control. The slider 1113 includes a first air bearing surface 1110, a second air bearing surface 1120, and a center portion 1130. A third air bearing surface 1140 bridges between the first and second air bearing surfaces 1110 and 1120, respectively. A recessed area 1105 is in the region defined by the air bearing surfaces. FIGS. 12 and 13 provide illustrative streamlines taken at a first radius, corresponding to an inner diameter of the disc 112, and a second radius, corresponding to an outer diameter of the disc 112, respectively. FIG. 13, in particular, demonstrates a potential flow reversal at point 1310 and a potential stagnation location at point 1320.

FIG. 14 is a diagrammatical top plan view of the advanced air bearing slider 1113 as illustrated in FIG. 13, with the addition of first and second streamline control elements 1450 and 1460, respectively. Third and fourth streamline control elements 1470 and 1480 extend in contact with the first air bearing surface 1110 and the second air bearing surface 1120, respectively.

As illustrated, the first streamline control element 1450 has a first end 1452 that is positioned in alignment with the center portion 1130 and a second end 1454 that extends towards the third air bearing surface 1140. Similarly, the second streamline control element 1460 has a first end 1462 that is positioned in alignment with the center portion 1130 and a second end 1464 that extends towards the third air bearing surface 240. In this particular embodiment, the first and second streamline control elements 1450 and 1460 are configured so that they are straight and parallel with each other.

Figure 15:
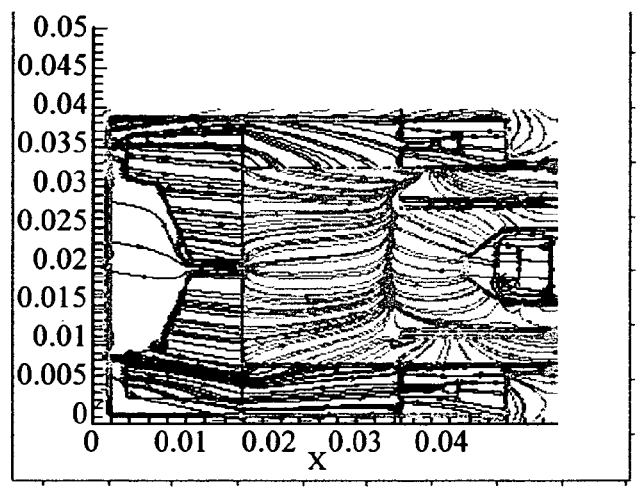
FIG. 15 illustrates the flow streamlines that result from the slider of FIG. 14, taken at an inner disc diameter.
Figure 16:
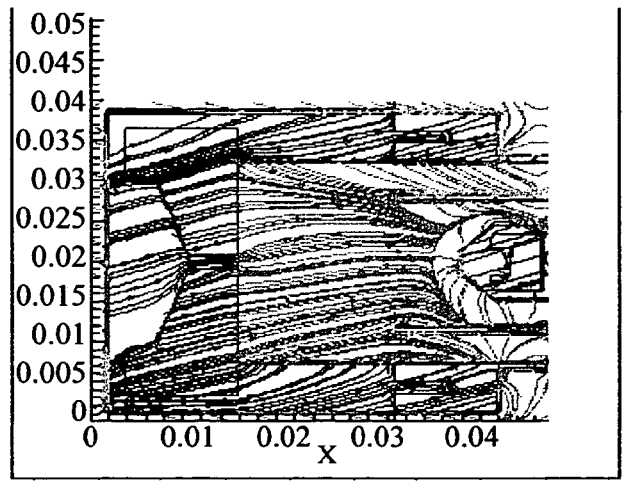
FIG. 16 illustrates the flow streamlines that result from the slider of FIG. 14, taken at an outer disc diameter.

FIGS. 15 and 16 illustrate the streamlines that result from including the first and second streamline control elements 1450 and 1460, as well as third and fourth streamline control elements 1470 and 1480. As expected, FIG. 16, which represents the situation at the outer diameter of a disc, demonstrates the most improvement over an advanced air bearing slider 1113 lacking such control elements (see FIG. 13). One can see in FIG. 16 that the potential flow reversal point 1310 (in FIG. 13) has been removed. Moreover, the potential stagnation point 1320 has been moved.

As noted, the streamline control elements 550, 560, 570, 580, 850, 860, 870, 880, 1450, 1460, 1470, 1480 described herein can be linear or straight. They can be configured so that they are parallel to one another, converge or even diverge. One of skill in the art will recognize that the particular dimensions of a streamline control element 550, 560, 570, 580, 850, 860, 870, 880, 1450, 1460, 1470, 1480 are largely design-controlled.

Once a slider 513, 813, 1413 has been designed to meet certain design criteria, the streamlines corresponding to that slider 513, 813, 1413 can be determined. Appropriate streamline control elements 550, 560, 570, 580, 850, 860, 870, 880, 1450, 1460, 1470, 1480 can be added to the design. An iterative process can be used to fine-tune the slider design itself and the streamline control elements 550, 560, 570, 580, 850, 860, 870, 880, 1450, 1460, 1470, 1480 as adjustments in the streamline control elements 550, 560, 570, 580, 850, 860, 870, 880, 1450, 1460, 1470, 1480 can adversely affect the design parameters of the slider 513, 813, 1413.

In summary, there is provided a reduced lubricant accumulating slider 513, 813, 1413 that includes a first air bearing surface 210, 1110 and a second air bearing surface 220, 1120. The slider 513, 813, 1113 also includes a center portion 230, 1130 that is at least partially located between the first air bearing surface 210, 1110 and the second air bearing surface 220, 1120. The slider 513, 813, 1413 also includes a first streamline control element 550, 850, 1450 that is located at least partially between the first air bearing surface 210, 1110 and the center portion 230, 1130 and a second streamline control element 560, 860, 1460 that is located at least partially between the second air bearing surface 220, 1120 and the center portion 230, 1130.

Preferably, the center portion 230, 1130 includes a center air bearing surface. In a preferred embodiment, there is a third streamline control element 570, 1470 in contact with the first air bearing surface 210, 1110 and a fourth streamline control element 580, 1480 in contact with the second air bearing surface 210, 1110. Preferably, there is a recessed area 205, 1105 between the first air bearing surface 210, 1110 and the second air bearing surface 220, 1120. In a preferred embodiment, each of the streamline control elements 550, 560, 570, 580, 850, 860, 870, 880, 1450, 1460, 1470, 1480 are elements that are raised above a surface of the recessed area 205, 1105, each element being less than or equal in height to the first and second air bearing surfaces 210, 220, 1110, 1120.

In a preferred embodiment, the slider 513, 813, 1113 further includes a third air bearing surface 240, 1140 that bridges the first air bearing surface 210, 1110 and the second air bearing surface 220, 1120. Preferably, the third air bearing surface 240, 1140 and the center air bearing surface 230, 1130 are positioned at opposite ends of the slider 513, 813, 1113, the center air bearing surface 230, 1130 being positioned beyond ends of the first and second air bearing surfaces 210, 220, 1110, 1120 that are opposite to the third air bearing surface 240, 1140.

The first and second streamline control elements 550, 850, 1450, 560, 860, 1460 can each have a first end 552, 562, 1452, 1462 that is positioned in relation to the center air bearing surface 230, 1130 and a second end 554, 564, 1454, 1464 that extends beyond the center air bearing surface 230, 1130 towards the third air bearing surface 240, 1140. Preferably, the first ends 552, 562, 1452, 1462 of the first and second control elements 550, 850, 1450, 560, 860, 1460 each conform to a shape of the center air bearing surface 230, 1130. The second ends 554, 564, 1454, 1464 of the first and second control elements 550, 850, 1450, 560, 860, 1460 are arranged and configured such that a distance between the first and second control elements 550, 850, 1450, 560, 860, 1460 increases as a distance to the third air bearing surface 240, 1140 decreases. Alternatively, they can be arranged so that a distance between the first and second control elements 550, 850, 1450, 560, 860, 1460 decreases as a distance to the third air bearing surface 240, 1140 decreases.

There is provided a reduced lubricant accumulating slider 513, 813, 1113 that includes streamline control means 550, 850, 1450, 560, 860, 1460 for limiting stagnation and flow reversal. Preferably, the slider 513, 813, 1113 also includes first and second air bearing means 210, 1110, 220, 1120 for providing lift to the slider 513, 813, 1113 at operational velocity, and center transducer means 230, 1130 for housing a transducer.

Preferably, the streamline control means 550, 850, 1450, 560, 860, 1460 includes a first streamline control element 550, 850, 1450 that is located in a recessed area 205, 1105 defined in part by the first air bearing means 210, 1110 and the center transducer means 230, 1130 and a second streamline control element 560, 860, 1460 that is located in a recessed area 205, 1105 defined in part by the second air bearing means 220, 1120 and the center transducer means 230, 1130. In a preferred embodiment, there is also a third streamline control element 870, 1470 in contact with the first air bearing means 210, 1110 and a fourth streamline control element 880, 1480 in contact with the second air bearing means 220, 1120.

There is also provided a method of reducing lubricant accumulation in a slider 513, 813, 1113 that has a geometry that is susceptible to stagnation and flow reversal. The slider 513, 813, 1113 includes a first air bearing surface 210, 1110, a second air bearing surface 220, 1120, and a center air bearing surface 230, 1130 that is located at least partially between the first air bearing surface 210, 1110 and the second air bearing surface 220, 1120. The method includes steps of determining which geometric features of the slider 513, 813, 1113 are prone to stagnation and flow reversal and modifying air flow around said geometric features in order to carry accumulated lubricant out from under the slider 513, 813, 1113.

In a preferred embodiment, the step of modifying air flow includes providing a first streamline control element 550, 850, 1450 and a second streamline control element 560, 860, 1460 in a recessed area 205, 1105 that is positioned between the first air bearing surface 210, 1110 and the second air bearing surface 220, 1120. Preferably, the first and second streamline control elements 550, 560, 850, 860, 1450, 1460 are arranged and configured to each have a first end 552, 562, 1452, 1462 that is positioned in relation to the center air bearing surface 230, 1130 and a second end 554, 562, 1452, 1462 that extends beyond the center air bearing surface 230, 1130.

Preferably, the first ends 552, 562, 1452, 1462 of each of the first and second control elements 550, 560, 850, 860, 1450, 1460 are arranged and configured to each conform to a shape of the center air bearing surface 230, 1130. In a preferred embodiment, the second ends 554, 564, 1454, 1464 of the first and second control elements 550, 560, 850, 860, 1450, 1460 are each arranged and configured such that a distance between the first and second control elements 550, 560, 850, 860, 1450, 1460 increases as a distance from the center air bearing surface 230, 1130 increases. Alternatively, the first and second control elements 550, 560, 850, 860, 1450, 1460 can be arranged and configured such that a distance between the first and second control elements 550, 560, 850, 860, 1450, 1460 decreases as a distance to the center air bearing surface 230, 1130 increases.

While the invention has been described with reference to specific embodiments, it will be apparent to those skilled in the art that many alternatives, modifications and variations may be made. Accordingly, the present invention is intended to embrace all such alternatives, modifications and variations that may fall within the spirit and scope of the appended claims.

We claim:

1. A reduced lubricant accumulating slider of the type having a leading edge and a trailing edge, the slider comprising:

a longitudinal centerline between the leading edge and the trailing edge;

a first air bearing surface;

a second air bearing surface;

a center portion located at least partially between the first air bearing surface and the second air bearing surface;

a first streamline control element for limiting stagnation and flow reversal located adjacent to a trailing edge at least partially between the first air bearing surface and the center portion; and a second streamline control element for limiting stagnation and flow reversal located adjacent to the trailing edge at least partially between the second air bearing surface and the center portion;

wherein the first streamline control element and the second streamline control element function to reduce lubricant accumulation, and wherein the first streamline control element and the second streamline control element are rearward of the longitudinal centerline.

2. The reduced lubricant accumulating slider of claim 1, wherein the center portion comprises a center air bearing surface.

3. The reduced lubricant accumulating slider of claim 1, further comprising a third streamline control element in contact with the first air bearing surface and a fourth streamline control element in contact with the second air bearing surface.

4. The reduced lubricant accumulating slider of claim 1, further comprising a recessed area between the first air bearing surface and the second air bearing surface.

5. The reduced lubricant accumulating slider of claim 4, wherein each of the streamline control elements comprises a portion that is raised above a surface of the recessed area, the portion having a height relative to the recessed area that is less than or equal in height to the first and second air bearing surfaces.

6. The reduced lubricant accumulating slider of claim 1, further comprising a third air bearing surface, wherein the first air bearing surface and the second air bearing surface are bridged by the third air bearing surface.

7. The reduced lubricant accumulating slider of claim 6, wherein the third air bearing surface and the center air bearing surface are positioned at opposite ends of the slider, the center portion being positioned beyond ends of the first and second air bearing surfaces that are opposite to the third air bearing surface.

8. The reduced lubricant accumulating slider of claim 6, wherein the first and second streamline control elements each have a first end that is positioned in relation to the center portion and a second end that extends beyond the center air bearing surface towards the third air bearing surface.

9. The reduced lubricant accumulating slider of claim 8, wherein the first ends of the first and second control elements each conform to a shape of the center portion.

10. The reduced lubricant accumulating slider of claim 8, wherein the second ends of the first and second control elements are arranged and configured such that a distance between the first and second control elements increases as a distance to the third air bearing surface decreases.

11. The reduced lubricant accumulating slider of claim 8, wherein the second ends of the first and second control elements are arranged and configured such that a distance between the first and second control elements decreases as a distance to the third air bearing surface decreases.

12. A reduced lubricant accumulating slider of the type having upstream and downstream portions with airflow directed from the upstream portion toward the downstream portion comprising streamline control means located proximate to the downstream portion of the slider for limiting stagnation and flow reversal.

13. The reduced lubricant accumulating slider of claim 12, further comprising:
first air bearing means for providing lift to the slider at operational velocity;
second air bearing means for providing lift to the slider at operational velocity; and
center transducer means for housing a transducer.

14. The reduced lubricant accumulating slider of claim 13, wherein the streamline control means comprises a first streamline control element located in a recessed area defined in part by the first air bearing means and the center transducer means and a second streamline control element located in a recessed area defined in part by the second air bearing means and the center transducer means.

15. A reduced lubricant accumulating slider of the type having a leading edge and a trailing edge, of the type used in a disk drive, the slider comprising:
first and second air bearing surfaces;
a lowered area between the first air bearing surface and the second air bearing surface;
a center air bearing surface arranged and configured with a portion extending between the first air bearing surface and the second air bearing surface;
a first streamline control element for limiting stagnation and flow reversal having a first portion located proximate to a trailing edge between the first air bearing surface and the center air bearing surface, and a second portion located in the lowered area; and
a second streamline control element for limiting stagnation and flow reversal having a first portion located proximate to the trailing edge between the second air bearing surface and the center air bearing surface, and a second portion located in the lowered area, wherein the first streamline control element and the second streamline control element are isolated and function to reduce lubricant accumulation.

16. The reduced lubricant accumulating slider of claim 15, further comprising a third streamline control element cooperatively connected to the first air bearing surface and a fourth streamline control element cooperatively connected to the second air bearing surface.

17. The reduced lubricant accumulating slider of claim 16, wherein the third and fourth streamline control elements are raised above a mean plane generally defined by a surface of the lowered area and are less than or equal in height to the first and second air bearing surfaces.

18. The reduced lubricant accumulating slider of claim 15, wherein the first and second streamline control elements are raised above a mean plane generally defined by a surface of the lowered area and are less than or equal in height to the first and second air bearing surfaces.

19. The reduced lubricant accumulating slider of claim 15, further comprising a third air bearing surface, wherein the first air bearing surface and the second air bearing surface are connected at an end of the first and second air bearing surfaces by the third air bearing surface.

20. The reduced lubricant accumulating slider of claim 19, wherein the first and second control elements are arranged and configured such that a distance between the first and second control elements decreases as a distance to the third air bearing surface decreases.

* * * * *